United States Patent [19]
Zhang

[11] Patent Number: 6,158,346
[45] Date of Patent: *Dec. 12, 2000

[54] ELECTRONIC PRINTING OF NON-PLANAR MACRO AND MICRO DEVICES

[75] Inventor: Xiang Zhang, State College, Pa.

[73] Assignee: The Penn State Research Foundation, University Park, Pa.

[*] Notice: This patent issued on a continued prosecution application filed under 37 CFR 1.53(d), and is subject to the twenty year patent term provisions of 35 U.S.C. 154(a)(2).

[21] Appl. No.: 09/338,392

[22] Filed: Jun. 22, 1999

Related U.S. Application Data

[60] Provisional application No. 60/090,176, Jun. 22, 1998.

[51] Int. Cl.⁷ .................................................. B41M 35/30
[52] U.S. Cl. ..................................... 101/489; 101/DIG. 37
[58] Field of Search ............................. 101/489, DIG. 37; 347/111, 112, 141, 120, 159, 153

[56] References Cited

U.S. PATENT DOCUMENTS

| | | | |
|---|---|---|---|
| 2,972,304 | 2/1961 | Jarvis | 101/489 |
| 3,306,198 | 2/1967 | Rarey | 101/489 |
| 3,585,061 | 6/1971 | Allinger et al. | 101/489 X |
| 3,640,746 | 2/1972 | Haas | 101/489 X |
| 3,902,421 | 9/1975 | Takahashi | 101/489 |
| 4,106,409 | 8/1978 | Kobayashi et al. | 101/489 X |
| 5,088,047 | 2/1992 | Bynum | 700/182 |
| 5,660,486 | 8/1997 | Okuda et al. | 400/120.07 |

Primary Examiner—John S. Hilten
Assistant Examiner—Minh H. Chau
Attorney, Agent, or Firm—Thomas J. Monahan

[57] ABSTRACT

A prototyping method and apparatus incorporating the invention enables rapid fabrication of heterogeneous parts with non-planar and/or layer-by-layer printing. An electronically addressable array of micro-electrodes is employed as a "printing" panel, A processor controls the printing panel through use of two dimensional planar slice data. Such slice data is used to address electrodes that correspond to points in the slice image. When the printing panel is brought close to a flat powder bed, a static electrical field at each addressed electrode attracts particles to the electrode's surface. The powder image on the printing panel electrodes is then placed over a substrate and the powder image is released to the substrate by applying a reverse polarity voltage to the electrodes. Multiple applications of powder image layers, with intervening fixing of each image layer, enables a three dimensional object to be rapidly constructed. Chemical/physical compositions can be tailored in each layer by addressing plural sets of signals to electrodes that are placed over different powder beds.

12 Claims, 4 Drawing Sheets

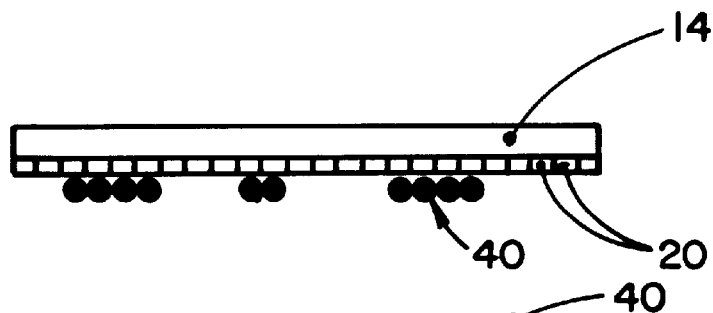
FIG.3a
FIG.3b
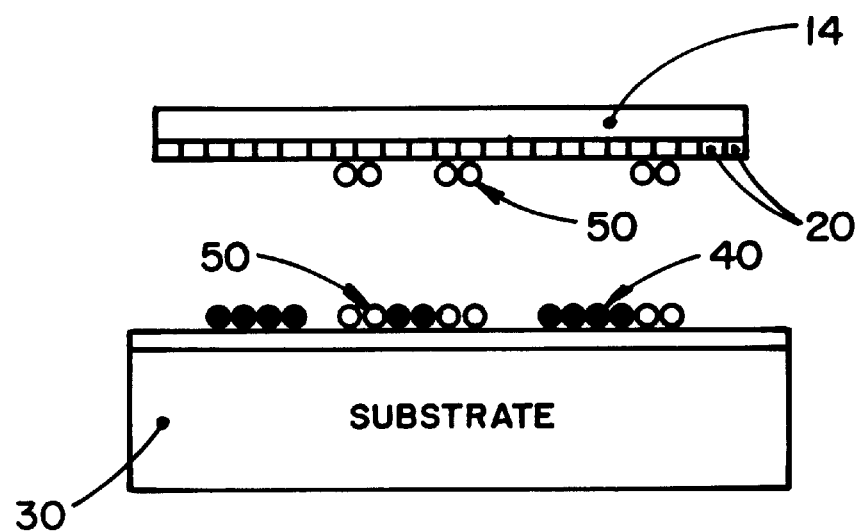
FIG.3c
FIG.3d
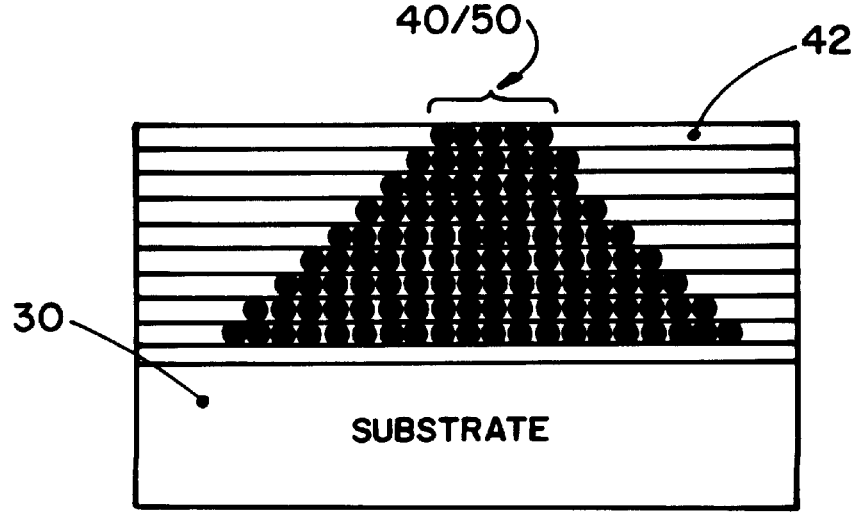
FIG.3e

ELECTRONIC PRINTING OF NON-PLANAR MACRO AND MICRO DEVICES

This patent application claims priority from Provisional Application, Serial No. 60/090,176, filed Jun. 22, 1998.

FIELD OF THE INVENTION

This invention relates to a method for creating prototypes of three dimensional objects and, more particularly, to a method for prototyping objects which makes use of an electrostatic printing process.

BACKGROUND OF THE INVENTION

While the field of rapid prototyping of three dimensional objects has recently seen substantial growth, a number of challenges still remain. First, a new methodology is needed which will allow a rapid prototyping of heterogeneous (physically and/or chemically) parts for specific functional devices. Second, a parallel process (such as a robust layer-by-layer process, in contrast to a point-by-point process) needs to be developed to gain speed for the prototyping. Third, non-planar fabrication technologies are required that will speed the prototyping process and enable the design and fabrication of high aspect ratio and complex macro/micro structures.

Currently, there are a number of rapid protoyping processes under development. Stereolithography (SLA) was the first commercialized, solid, free form fabrication process. It created plastic models directly from liquid photo-curable polymers by a scanning laser beam in a point-by-point fashion onto the polymer to selectively cure the illuminated points in accord with an image of the desired device. Laminated Object Manufacturing (LOM) employs a laser to cut laminated materials and subsequently stacks the cut materials to form a 3D object. Currently the LOM material has very limited composition control.

3-D Printing (3DP), developed at MIT, builds 3D parts by selective deposition of molten wax droplets onto planar powder layers, with the wax acting to bind the powder at the deposition points. Thus, while 3DP printing works for building homogeneous and inhomogeneous parts, it is based on a point-by-point serial deposition process that limits its speed and accuracy.

Selective Laser Sintering (SLS), developed at the University of Texas at Austin, fuses powders to form 2D layers by a point-by-point scan of a laser beeam. Mask and Deposition (MD) developed at Carnegie Mellon University is a thermal spray deposition process which directly builds three-dimensional multi-material structures of arbitrary geometric complexity. However, a large number of masks are required.

The relatively new Direct Photo Shaping process developed at SRI, Inc. is based on layer-by-layer photocuring of a mixture of ceramic slurries and photo sensitive monomers. This method provides a way of maskless rapid prototyping of homogeneous parts.

Each of the above-noted technologies is based on either a planar or layer-by-layer buildup of a material to form a 3D object. All of these processes are limited to fabrication of either homogeneous (i.e., single phase) parts or low speed point-by-point fabrication. Versatile rapid prototyping with desired chemical/physical gradients cannot be realized with the present technologies. A practical non-planar approach for ultra-fast prototyping of functional devices has not yet been developed.

Accordingly, it is an object of this invention to provide a non-planar approach for ultra-fast prototyping of functional devices.

It is another object or this invention to provide a rapid prototyping process that enables construction of a three dimensional object comprised of heterogeneous materials.

SUMMARY OF THE INVENTION

A prototyping method and apparatus incorporating the invention enables rapid fabrication of heterogeneous parts with non-planar and/or layer-by-layer printing. An electronically addressable array of micro-electrodes is employed as a "printing" panel, A processor controls the printing panel through use of two dimensional planar slice data. Such slice data is used to address electrodes that correspond to points in the slice image.

When the printing panel is brought close to a flat powder bed, a static electrical field at each addressed electrode attracts particles to the electrode's surface. The powder image on the printing panel electrodes is then placed over a substrate and the powder image is released to the substrate by applying a reverse polarity voltage to the electrodes. Multiple applications of powder image layers, with intervening fixing of each image layer, enables a three dimensional object to be rapidly constructed. Chemical/physical compositions can be tailored in each single layer by addressing plural sets of signals to electrodes that are placed over different powder beds.

The invention thus enables (1) rapid prototyping of heterogeneous parts; and (2) parallelism, i.e., layer-by-layer building and non-planar building.

BRIEF DESCRIPTION OF THE DRAWINGS

FIGS. 3a–3e illustrate a second rapid prototyping method employed by the invention, wherein heterogeneous powders are employed.

DETAILED DESCRIPTION OF THE INVENTION

Figure 1A:
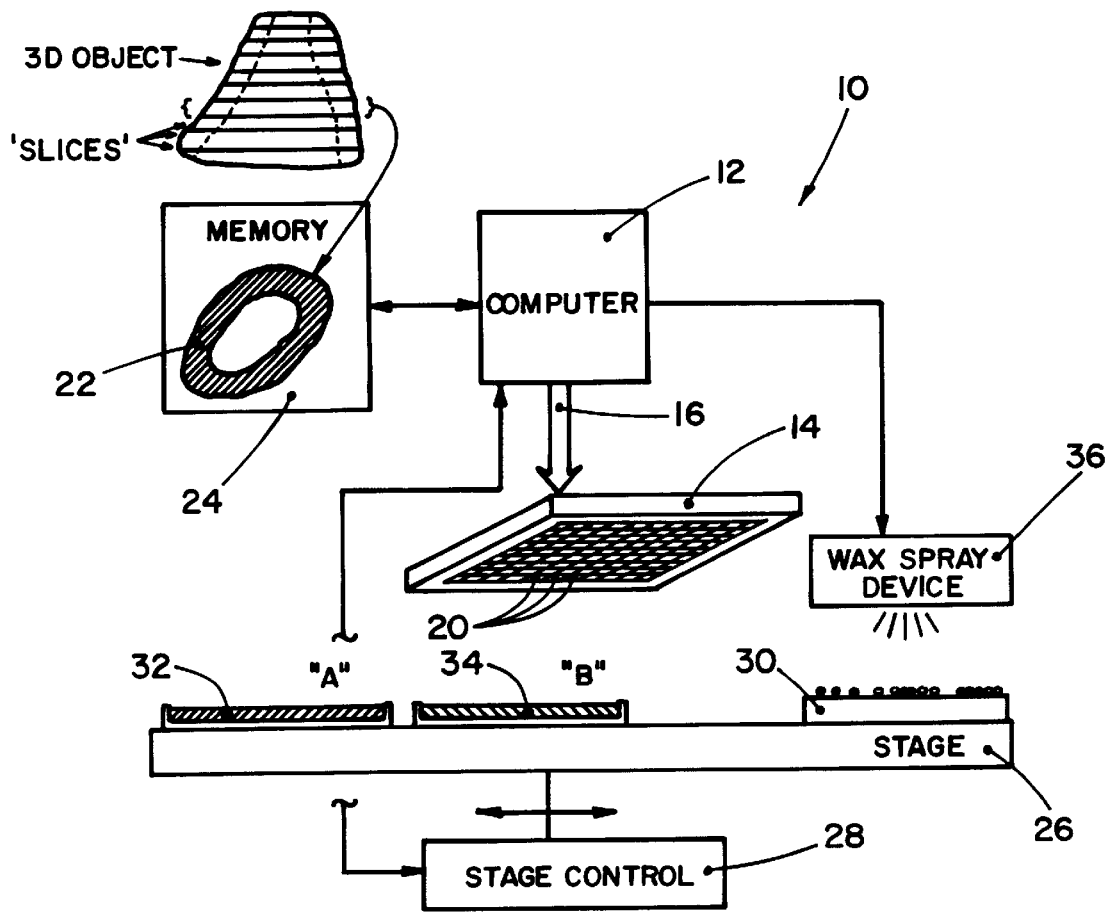
FIG. 1a is a high level block diagram of a prototyping apparatus incorporating the invention hereof.

The prototyping system and method of the invention enables rapid construction of heterogeneous functional devices with non-planar and/or layer-by-layer printing processes. Fabrication of large-scale parts is possible, since the scale is limited only by the size of the panel of printing electrodes. Existing flat panel display technology provides a cost effective fabrication process for the printing panel electrode array.

Before describing the invention in detail, a brief overview is presented. A printing panel comprising a two dimensional array of micro-electrodes is used as a printhead. Each of the individual electrodes is addressable, electronically, using a specified voltage. Upon being addressed, an electrostatic field is generated close to the surface of the addressed electrodes.

The printing panel is then brought close to a flat metal powder bed and the electrostatic forces at the addressed electrodes attract the powder(s) to the surfaces of the addressed electrodes. Thus, a 2D slice powder image is formed on the printing panel according to 2D slice data from a computer-aided-design (CAD) model generated from a computer. The printing panel is then brought over a substrate, and the entrained powders are released by applying a reverse bias voltage to the previously addressed electrodes. The powder image is thereby deposited on the substrate, i.e., "printed". Hereafter, the term "substrate" is used to mean either a support with no previously deposited powder layers thereon or a support with already deposited powder layers that are to be used as substrates for additional powder layers.

Subsequently, a uniform molten material spray (such as a wax or polymer) is applied to the powder layer and, upon solidification, it joins and fixes the powder particles at their locations. The sprayed material also provides a sacrificial support for printing of next layer and can be melt/burnt out at higher temperature, after the 3D green part is built.

A second method for joining or fixing the particles is through use of micro-welding. After release of the powder particles from the printing electrode, a higher voltage is applied between the electrode and the substrate, and micro-arcs are generated between the powder particles and the electrodes. The arcs fuse the particles to form a solid layer.

A third method combining the first two methods may also be used where the deposited powders are fused, both among themselves and through the wax interlayers.

Since the electrical force at each electrode determines the number of powder particles to be attached, the physical thickness of a 2D powder layer can be adjusted by varying the voltage applied to each electrode. For larger size particles, a cluster of electrodes can be used to gain enough attractive force in order to lift a heavier particle. Hence, the system can accommodate different types and sizes of powders in fabrication of functional devices.

Heterogeneous devices can be fabricated through use of the invention. Chemical compositions can be "digitally" controlled to form a desired gradient in the part, in order to achieve one or more specific functions. Under such a circumstance, the printing panel is first addressed to attract a first type of particles, and then a 2D powder image of the first type particles is printed to the substrate. This process is then repeated for second, third, etc., types of particles, respectively, producing a "composite" layer consisting of various chemical components comprising the respective types of powders.

Micro-welding can be used to fuse each type of particle onto a substrate or onto each underlayer before repeating the operation for another type of particle. A spray method, on the other hand, can be applied after the whole composite layer is formed. Since the micro-electrodes only generate very localized electrical fields, and first and second types of particles within of a single layer are off-set, interference between first type particles (already printed) and second type particles (to be printed is small.

Controlling CAD files are decomposed by not only "physically" slicing 2D layers, but also by specifying the chemical compositions for each layer. The invention also enables non-planar forming of powder images. This is accomplished through use of increased magnitude voltages for addressing purposes. These voltages provide increased electrostatic forces so that an addressed electrode is able to attract more than one particle. Therefore, instead of forming 2D images of powders on the printing panel, a non-planar structure is generated directly in one operation, through use of varying address voltage magnitudes. The release of the non-planar structures is digitally controlled by incrementally decreasing the voltage at each electrode. This enables the particles to be released on a layer-by-layer fashion, since the attraction force is reduced by decreasing the voltage.

For non-metallic powders, it is necessary to charge the particles before bringing the printing panel electrodes close to them. In the case of metallic particles, electrodes that are to attract particles are addressed using either sign of voltage (+ or −), as an electrical induction force can be generated by either sense voltage. Other electrodes which are not to attract particles are grounded to prevent particle attachment.

In the case of non-metallic particles, all electrodes on the panel are addressed, because the particles are pre-charged. Electrodes which are to attract particles should preferably be addressed with the opposite sign voltage to that of the charged particles, while the rest of the electrodes should be addressed with the same sign voltage as the charged particles. By applying the same sign voltage on the electrodes, powder particles are rejected from these electrodes.

The reason for applying the same sign voltage, instead of grounding the electrodes, is that the grounded electrode (voltage=0) will have opposite charges induced thereon by the charges of particles due to the electrical induction effect. This will lead to a net attractive force between the electrodes and the particles, that will eventually cause particle attachment).

Referring now to FIG. 1, a prototyping system 10 incorporating the invention comprises a control computer 12 that is connected to a printing panel 14 via a data bus 16. Printing panel 14 comprises a plurality of individual micro-electrodes 20 (shown in expanded form) that are individually addressable by computer 12, in accordance with two dimensional slice data 22 contained in a memory 24.

To obtain the slice data, a computer aided design program causes a 3-dimensional object to be "sliced" into 2-dimensional data files. Those files are individually stored and define a planar cross section through the device to be constructed.

A movable stage 26 is positioned below printing panel 14 and is controllably movable in accordance with inputs to a stage control mechanism 28. Stage 26 supports a substrate 30 on which multiple layers of a particulate/powder material are to be deposited. Also positioned on stage 28 are one or more receptacles 32, 34, etc. each of which contains a different type of particulate that is to be deposited onto substrate 30. Hereafter, the particulate in receptacle 32 will be referred to as Type A and the particulate in receptacle 34 will be referred to as Type B. It is to be understood that the chemical compositions or physical properties of Type A particle and Type B particle may differ substantially. This enables the device being constructed on substrate 30 to exhibit a graded chemical composition varying from totally Type A to totally Type B, with intermediate layers comprising graded mixtures thereof.

Also positioned above stage 26 is a wax spray device which is utilized, under control of computer 12, to apply a layer of uniform wax onto each layer of particulate material that is deposited onto substrate 30. As indicated above, wax spray device 36 is optional and may be combined with or supplanted by the use of a microwelding procedure that utilizes the micro-electrodes of printing panel 14.

Figure 1B:
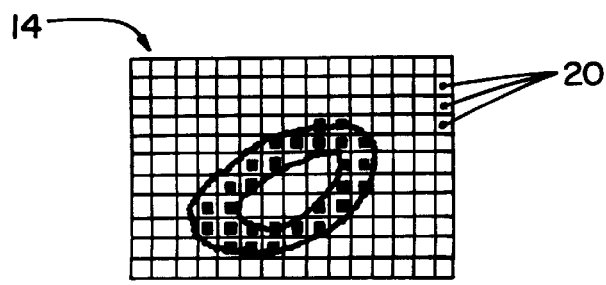
FIG. 1b is a schematic view of the electrode arrangement of a printing panel employed by the invention.

FIG. 1b illustrates a planar bottom view of printing panel 14 and shows the arrangement of electrodes 20 thereon.

Note that an image of a layer of the device to be constructed is superimposed on the view and indicates which electrodes are addressed to enable deposition of a particulate layer in accordance with the displayed image.

Turning now to FIGS. 2a–2d, a first embodiment of the invention will be described. Initially (FIG. 2a), computer 12 applies address voltages to electrodes 20 in accordance with a slice image to be deposited onto substrate 30. At the same time, printing panel 14, along with electrodes 20, is positioned over receptacle 32. Addressed electrodes 20 then attract particles 40 from particulate bed 32 via an attractive electrostatic force. This action forms a 2-D particulate image on the face of printing panel 14.

Figure 2A:
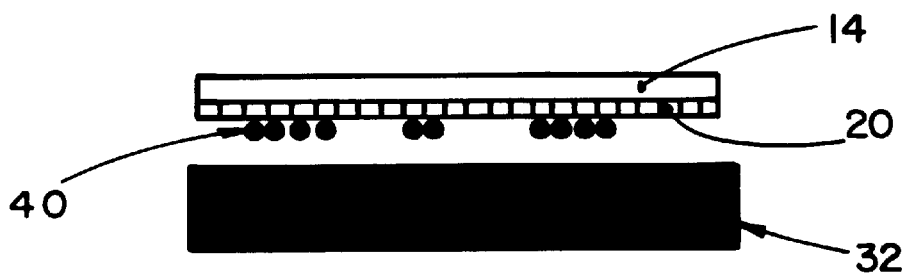
FIGS. 2a–2d illustrate a first rapid prototyping method employed by the invention, using homogeneous powders.
Figure 2B:
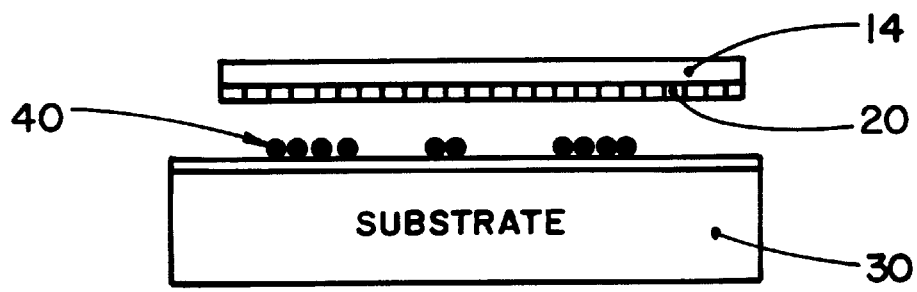

Thereafter, printing panel 14 is positioned over substrate 30 (FIG. 2b). Computer 12 then applies release potentials to the previously addressed electrodes 20 to cause particulate matter 40 to be deposited onto the surface of substrate 30. It is preferred that the release potential be opposite in sense to the address potential so that particles 40 are repelled towards substrate 30 (assuming that particles 40 carry a previous charge). If particles 40 comprise metal particles, the potentials on electrodes 20 are returned to a neutral value so as to remove the inductive attraction force.

Figure 2C:
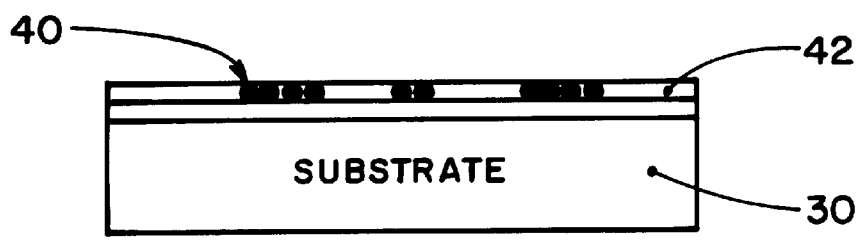
Figure 2D:
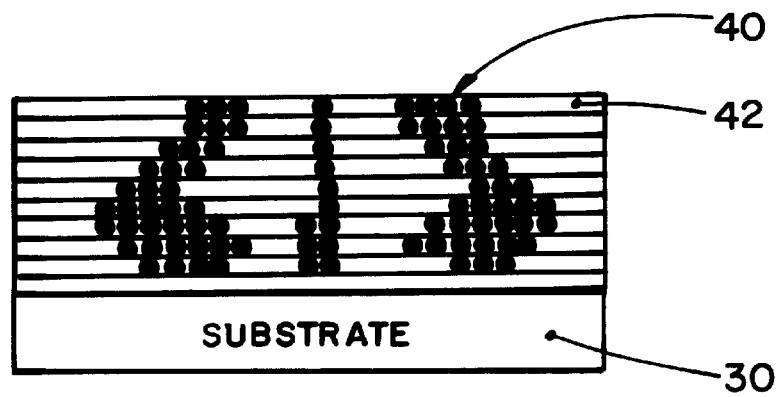

A thin wax layer is now uniformly sprayed over particles 40 so as to bind the particles together and provide a support surface for a next layer of particles. Thereafter, the process shown in FIGS. 2a–2c is repeated, as shown in FIG. 2d, so as to enable creation of a 3-dimensional structure, built on a layer-by-layer basis, on substrate 30. Substrate 30 is then removed and is subjected to a higher temperature process which fuses particles 40 and causes a burn-off of wax layers 42.

A second embodiment of the invention is shown in FIGS. 3a–3e and operates in much the same manner as the method shown in FIGS. 2a–2d. However, the method of FIGS. 3a–3e enables plural particulate types to be emplaced in each layer of the ultimate device. Initially (FIG. 3a), selected electrodes 20 of printing panel 14 are addressed in accordance with where Type A particulate is to be deposited onto substrate 30 and the Type A particulate is attracted and adhered thereto. As shown in FIG. 3b, particulate 40 (Type A) is then deposited onto substrate 30 in accord with the technique described with respect to FIG. 2.

Printing panel 14 is now moved over receptacle 34 wherein Type B particulate resides. Electrodes 20 are then addressed in accordance with the positioning of Type B particulate (50) in the image slice to be deposited. Particulate 50 is thus attracted to electrodes 20. Printing panel 14 is next moved over substrate 26 (FIG. 3c) and the "image" of Type B particles 50 is printed by imparting release potentials to the electrodes 20 that were previously addressed to attract the Type B particles (FIG. 3d). The resulting image on substrate 30 now comprises a 2-dimensional "composite" image of Type A and Type B particles, 40 and 50. Thereafter, a wax spray is applied to the particulate layer and subsequent layers are emplaced onto substrate 30 to construct the final 3-D device (FIG. 3e).

Accordingly, a device can be comprised of a heterogenous particulate mixture to reflect a tailored chemical gradient from one extremity to another, in accordance with the ratio of deposited Type A and Type B particles. Further, the Type A and Type B particles may be layered, interspersed, etc., etc.

Figures 4A, 4B, 4C, 4D, 4E:
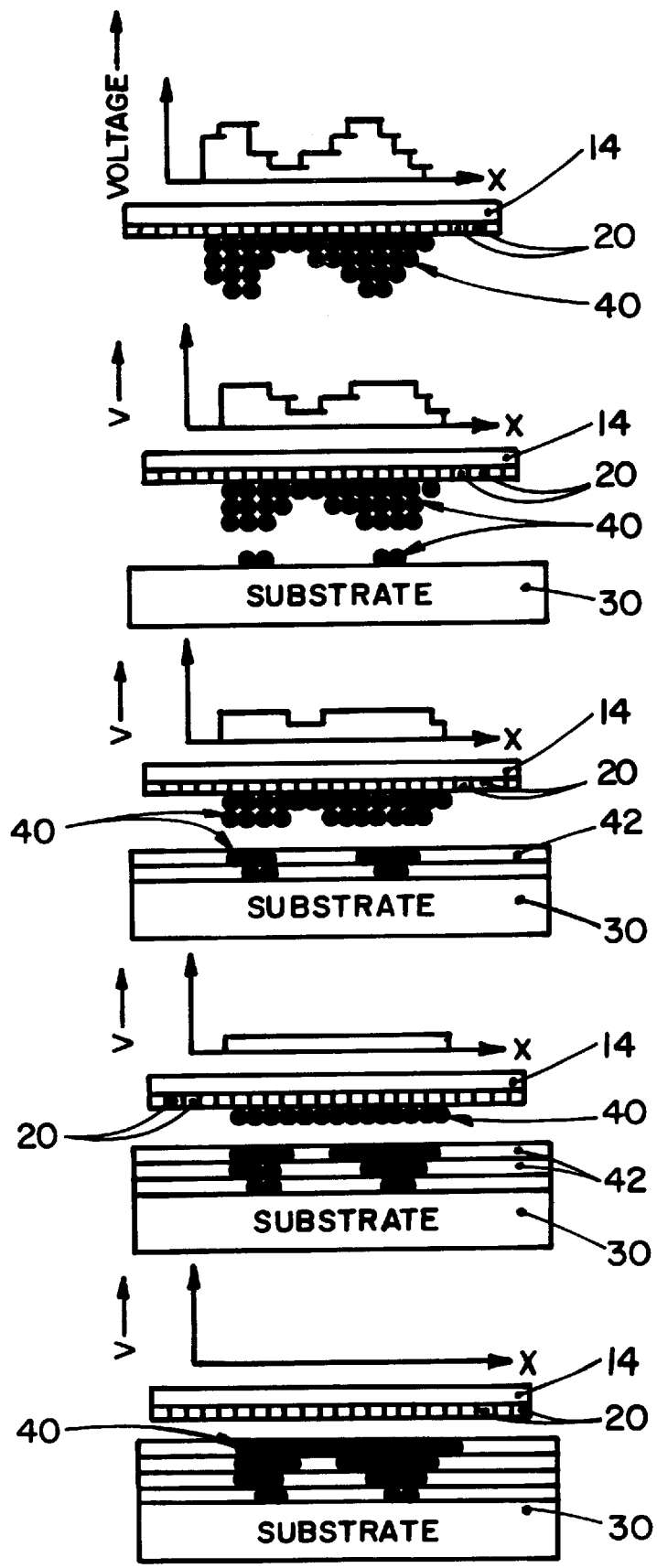
FIGS. 4a–4e illustrate a third rapid prototyping method employed by the invention, wherein various levels of voltages are applied to the electrodes to accomplish construction of a three dimensional object

In FIGS. 4a–4e, a third embodiment of the invention is illustrated. In this embodiment, the applied address voltages to electrodes 20 are varied in magnitude so as to enable individual electrodes to attract different quantities of particles. Thereafter, entrained particles are released, incrementally, so as to enable the build up of a multi-layered device structure. Initially, printing panel 14 is placed over Type A particle receptacle 32 and varying level address voltages are applied to respective electrodes 20 in accordance with a 3-dimensional set of address values. The address voltages are dependent upon the ultimate device to be formed. The larger the magnitude of the address voltage, the more of the Type A particulate that is attracted to an addressed electrode to which the voltage is applied (FIG. 4a).

As shown in FIG. 4b, printing panel 14 is next positioned over substrate 30. To create the release potential, the address voltages that are still applied to electrodes 20 are reduced by a discrete partial value. This enables some of the adhered particulate to be released onto substrate 30. Thereafter, printing panel 14 is moved aside and a wax immobilizing layer is emplaced or the micro-welding procedure is used.

Printing panel 14 is again positioned over substrate 30 and the address voltages are again reduced by a discrete partial value to release further particulate still adherent thereto. Printing panel 14 is moved away from substrate 30 and a wax layer is applied to immobilize the thus-deposited particulate material (or the micro-welding procedure is used). The process is repeated (FIGS. 2d and 2e) until all of the particulate material has been deposited and immobilized onto substrate 30.

The invention thus enables high speed, direct layer-by-layer deposition (in contrast to point-by-point protoyping) of heterogeneous functional gradient parts. Further, the invention enables non-planar prototyping of the functional parts. Fabrication of tailored physical/chemical gradients in a part can lead to a major technology advancee in the fields of aerospace engineering, automobile manufacturing, etc.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for creating an object through use of plural deposited layers of a first particulate on a substrate, said method employing a two dimensional electrode panel, a control computer connected to said electrode panel and at least a first particulate receptacle, said method comprising the steps of:

a) providing relative movement between said electrode panel and said first particulate receptacle to juxtaposition said electrode panel to said at least first particulate receptacle, said electrode panel comprising a two dimensional array of individual electrodes each being separately electronically addressable for generating, in response to an applied voltage, a localized electrostatic field;

b) applying address voltages to an image pattern of selected electrodes of said electrode panel so as to attract first particulate to said selected electrodes;

c) providing relative movement between said electrode panel and said substrate to juxtaposition said electrode panel to said substrate;

d) applying release potentials to said selected electrodes of said electrode panel so as to release said first particulate therefrom and to deposit said first particulate onto said substrate;

e) fixing said first particulate onto said substrate; and f) repeating steps a)–e) so as to deposit additional, at least partially superposed, layers of said first particulate onto said substrate until a desired three dimensional device, comprising multiple layers of said first particulate material, is formed.

2. The method as recited in claim 1, wherein said fixing step e) applies a layer of an organic material onto said substrate so as to immobilize said first particulate, said method comprising the additional step of:

g) applying heat to burn off said organic material while fusing together said first particulate material.

3. The method as recited in claim 2, wherein said fixing step e) further applies an increased voltage to said image pattern of selected electrodes of said electrode panel so as to create a current flow between said selected electrodes and said substrate which fuses together said first particulate.

4. The method as recited in claim 1, wherein said fixing step e) applies an increased voltage to said image pattern of selected electrodes of said electrode panel so as to create a current flow between said selected electrodes and said substrate which fuses together said first particulate.

5. The method as recited in claim 1, wherein a second particulate receptacle is provided that includes a second particulate that differs from said first particulate, said method comprising the further steps of:

repeating steps a)–d) with respect to said second particulate receptacle so as to apply to said substrate said second particulate and create a layer on said substrate of both said first particulate and said second particulate; and performing steps e) and f) with respect to said first particulate and second particulate until a desired three dimensional device, comprising multiple layers of said first particulate and second particulate is formed.

6. The method as recited in claim 5, wherein said fixing step e) applies a layer of an organic material onto said substrate so as to immobilize said first particulate and second particulate and said method comprises the additional step of:

g) applying heat to burn off said organic material while fusing together said first particulate and second particulate.

7. The method as recited in claim 6, wherein said fixing step e) further applies an increased voltage to said image pattern of selected electrodes of said electrode panel so as to create a current flow between said selected electrodes and said substrate which fuses together said first particulate.

8. The method as recited in claim 5, wherein said fixing step e) applies an increased voltage to said image pattern of selected electrodes of said electrode panel so as to create a current flow between said selected electrodes and said substrate which fuses together said first particulate and second particulate.

9. A method for creating an object through use of plural deposited layers of a particulate on a substrate, said method employing a two dimensional electrode panel, a control computer connected to said electrode panel and at least a first particulate receptacle, said method comprising the steps of:

a) providing relative movement between said electrode panel and said particulate receptacle to juxtaposition said electrode panel to said at least first particulate receptacle, said electrode panel comprising a two dimensional array of individual electrodes each being separately electronically addressable for generating, in response to an applied voltage, a localized electrostatic field;

b) applying address voltages of differing magnitudes to an image pattern of selected electrodes of said electrode panel so as to attract different quantities of said first particulate thereto, in accord with said address voltages of differing magnitudes;

c) providing relative movement between said electrode panel and said substrate to juxtaposition said electrode panel to said substrate;

d) applying release potentials to said selected electrodes of said electrode panel, said release potentials set so as to release selected partial amounts of said first particulate from at least some said selected electrodes of said electrode panel so as to deposit said partial amounts of first particulate onto said substrate;

e) fixing said first particulate onto said substrate; and f) repeating steps d) and e) so as to deposit additional, at least partially superposed, layers of said first particulate onto said substrate from said electrodes of said electrode panel until a desired three dimensional device, comprising multiple layers of said first particulate is formed.

10. The method as recited in claim 9, wherein said fixing step e) applies a layer of an organic material onto said substrate so as to immobilize said partial amounts of said first particulate thereon and said method comprises the additional step of:

g) applying heat to burn off said organic material while fusing together said first particulate.

11. The method as recited in claim 10, wherein said fixing step e) further applies an increased voltage to said image pattern of selected electrodes of said electrode panel so as to create a current flow between said selected electrodes and said substrate which fuses together said first particulate.

12. The method as recited in claim 9, wherein said fixing step e) applies an increased voltage to said image pattern of selected electrodes of said electrode panel so as to create a current flow between said selected electrodes and said substrate which fuses together said first particulate.

* * * * *